United States Patent [19]

King et al.

[11] Patent Number: 4,521,953
[45] Date of Patent: Jun. 11, 1985

[54] METHOD OF ASSEMBLING A DYNAMOELECTRIC MACHINE

[75] Inventors: James L. King; John E. Hennessy, both of Holland, Mich.

[73] Assignee: General Electric Company, Fort Wayne, Ind.

[21] Appl. No.: 598,902

[22] Filed: Apr. 10, 1984

[51] Int. Cl.³ .............................................. H02K 15/14
[52] U.S. Cl. ...................................... 29/596; 29/732; 29/736
[58] Field of Search .......................... 29/596, 732, 736; 310/42, 91, 89, 254, 258, 259

[56] References Cited

U.S. PATENT DOCUMENTS

| Re. 24,909 | 12/1960 | Dochterman | 103/87 |
|---|---|---|---|
| 2,254,558 | 9/1941 | Williams | |
| 2,924,312 | 2/1960 | Williams | 189/36 |
| 3,670,405 | 6/1972 | Dochterman | 29/596 |
| 3,726,000 | 4/1973 | Hafner | 29/21.1 |
| 3,771,216 | 11/1973 | Johnson | 29/509 |
| 3,900,937 | 8/1975 | Schleicher | |
| 3,961,416 | 6/1976 | Otto | 29/596 |

OTHER PUBLICATIONS

Fastitch Bulletin—(Tech-Line Engineering Company).
BTM Bulletin No. 60.03.
BTM Bulletin No. 60.11.

Primary Examiner—Carl E. Hall
Attorney, Agent, or Firm—Joseph E. Papin

[57] ABSTRACT

A method of assembling a dynamoelectric machine having at least one end frame and a stator assembly. The end frame has a set of apertures extending therethrough, and the stator assembly includes a stator core, a set of beams mounted thereto, and at least one set of tabs on the beams, respectively. In practicing this method, the end frame is disposed in an assembly position with respect to the stator core, and the tabs are received in the apertures in spaced apart relation therefrom with free end portions of the tabs extending beyond the end frame. The free end portions are displaced into overlaying relation with confronting parts of the end frame, and overlaying sections of the free end portions and the confronting parts of the end frame in the overlaying relation thereof are clinched together.

33 Claims, 20 Drawing Figures

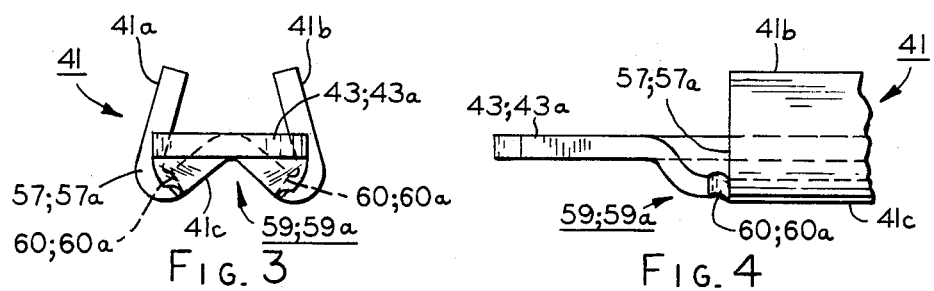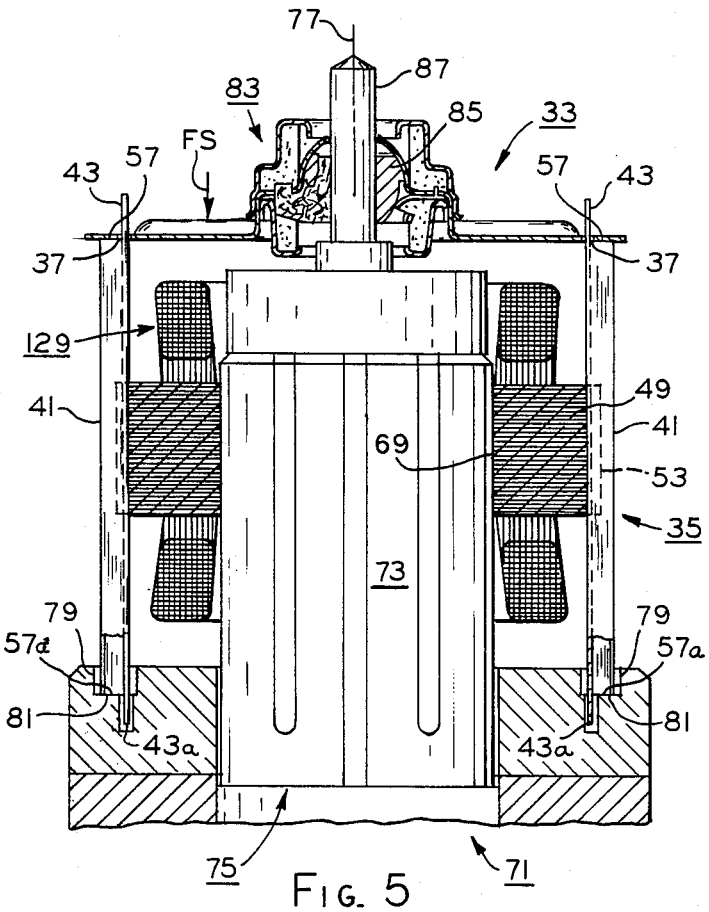

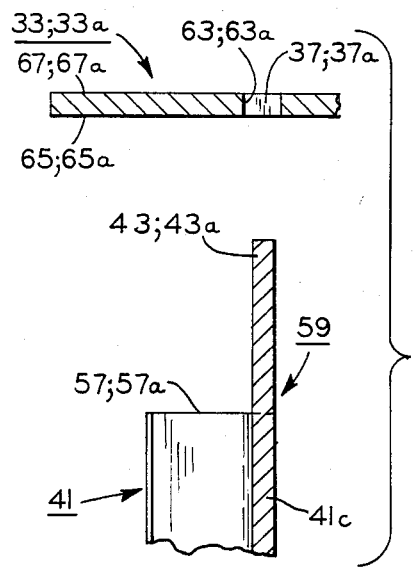
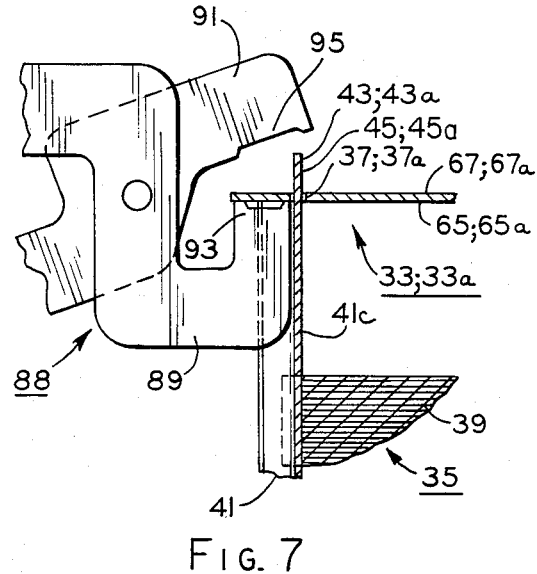
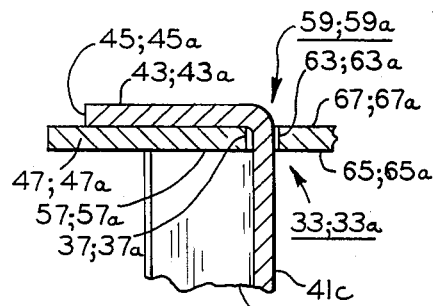
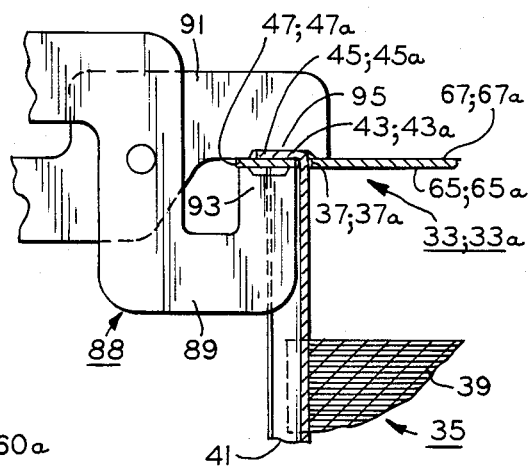
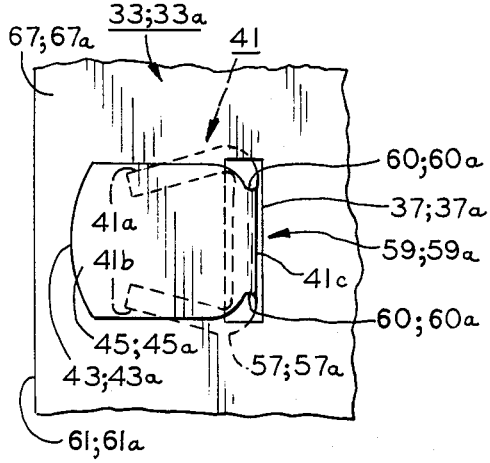
FIG. 6
FIG. 7
FIG. 9
FIG. 8
FIG. 10

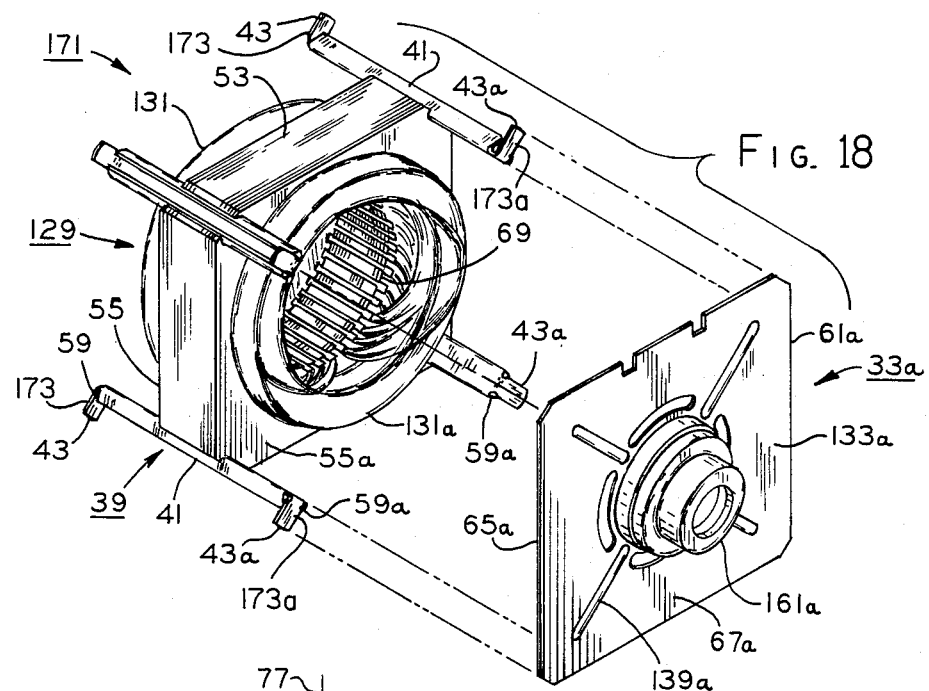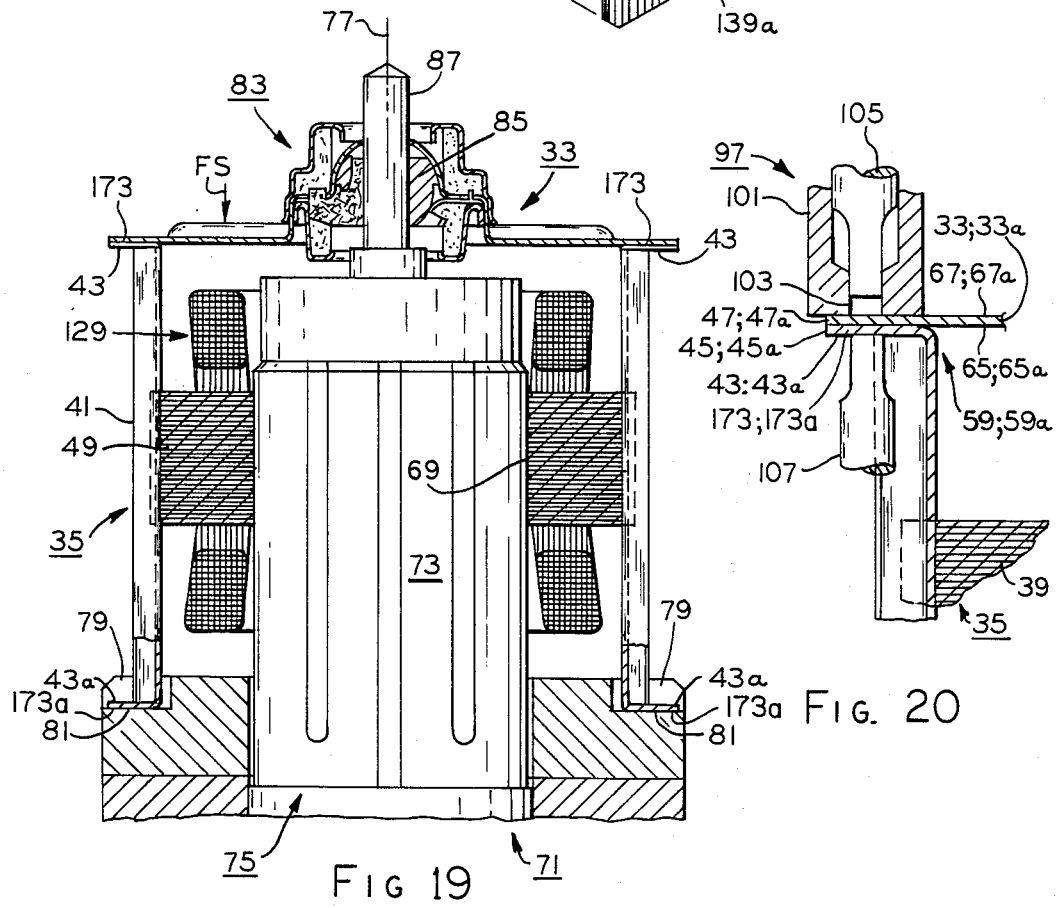

METHOD OF ASSEMBLING A DYNAMOELECTRIC MACHINE

CROSS-REFERENCE TO RELATED APPLICATIONS

This application is related to the commonly assigned application Ser. No. 506,344 filed June 21, 1983, the commonly assigned application Ser. No. 402,320 filed July 27, 1982 (now U.S. Pat. No. 4,473,764 issued Sept. 25, 1984) and the U.S. commonly assigned application Ser. No. 402,282 filed July 27, 1982 now U.S. Pat. No. 4,480,378; and, the disclosures of each of the aforementioned related applications are incorporated by reference herein.

FIELD OF THE INVENTION

This invention relates in general to electrical apparatus and in particular to methods of assembling dynamoelectric machine.

BACKGROUND OF THE INVENTION

In the past, various different constructions for an open motor have been utilized along with various different methods of assembling such an open motor. One definition of an open motor is that it has ventilating openings which permit passage of cooling air over and around the windings of such open motor, and this definition may be found in the C. G. Veinott textbook entitled "Fractional And Subfractional Horsepower Electric Motors" (third edition, McGraw-Hill Book Co.). For examples of open motor constructions, reference may be had to U.S. Pat. No. 3,164,422 issued Jan. 5, 1965 to Paul B. Shaffer et al. and U.S. Pat. No. 3,858,067 issued Dec. 31, 1974 to Charles W. Otto.

In the past, it is believed that at least some of the prior art open motor constructions and methods of assembling such provided improved yet inexpensive motors having the capability to be used for a number of diverse applications having different duty capacities which may have required different strengths designed into the structural components of such open motors and, of course, effected by the method of assembling such. While many of the prior art open motor constructions and methods of assembling such undoubtedly exhibited many salient features, it is quite desirable to provide an improved yet inexpensive open motor having many of such salient features yet obviating the introduction of residual stresses into the motor frame during the assembly of such open motor which may have a deleterious affect on the desired air or flux gap thereof.

SUMMARY OF THE INVENTION

Among the several objects of the present invention may be noted the provision and improved methods of assembling dynamoelectric machines; the provision of such improved methods in which residual forces on components of a stationary assembly of the dynamoelectric machine are eliminated; the provision of such improved methods in which the elimination of such residual forces provides for positive control of the desired air or flux gap of the dynamoelectric machine; the provision of such improved methods in which completely mechanical joints are utilized without additional material thereby to obviate the residual stresses and retain together an end frame and supporting beams therefor of the stationary assembly; the provision of such improved methods in which the end frame is arranged in overlaying relation with deformed distal portions of tabs on the beams with the deformed distal portions and confronting parts therefor on the end frame being clinched together thereby to define the mechanical joints, respectively; the provision of such improved methods in which yieldable sections are predeterminately located in the tabs to insure uniform deformation thereof and to prevent imparting of residual forces into the stationary assembly in response to such deformation; the provision of such improved methods in which the tabs are predeterminately maintained in spaced apart relation from apertures in the end frame through which the tabs extend; and the provision of such improved methods in which the components utilized therein are simple in design, economically manufactured and easily assembled. These as well as other objects and advantageous features of the present invention will be in part apparent and in part pointed out hereinafter.

In general and in one form of the invention, a method is provided for assembling a dynamoelectric machine having at least one end frame and a stator assembly. The at least one end frame has a set of apertures extending therethrough, and the stationary assembly includes a stator core, a set of means associated with the stator core for supporting the at least one end frame in a preselected assembly position with respect to the stator core, and at least one set of tabs on the supporting means, respectively. In practicing this method, the at least one end frame is disposed on the supporting means in the preselected assembly position with respect to the stator core, and the tabs are received in the apertures in spaced apart relation therefrom with a free end portion of the tabs extending beyond the at least one end frame, respectively. The free end portions are displaced into overlaying relation with confronting parts of the at least one end frame while maintaining the spaced apart relation between the tabs and the apertures, respectively, and thereby the at least one end frame is retained against axial displacement from the preselected assembly position thereof. A set of overlaying sections is deformed from the free end portions of the tabs and the confronting parts of the at least one end frame in the overlaying relation thereof, and one of the deformed overlaying sections is interlocked with one of the free end portions and the at least one end frame thereby to retain the at least one end frame against at least radial displacement from the preselected assembly position thereof, respectively.

Also in general, a method in one form of the invention is provided for assembling a dynamoelectric machine having at least one end frame, a stator core, a set of means associated with the stator core for supporting the at least one end frame with respect to the stator core, and with the supporting means including at least one set of tabs extending therefrom, respectively. In practicing this method, the tabs are deformed, and confronting parts on the at least one end frame are associated in overlaying relation with the deformed tabs, respectively. A set of overlaying sections is deformed from the deformed tabs and the confronting parts of the at least one end frame in the overlaying relation thereof, and one of the deformed overlaying sections is interlocked with one of the deformed tabs and the at least one end frame thereby to retain the at least one end frame against both axial and radial displacement therefrom, respectively.

BRIEF DESCRIPTION OF THE DRAWINGS

FIG. 3 is an enlarged end view of one beam of a set thereof before it is secured to a stator core of the dynamoelectric machine in FIG. 1;

FIG. 4 is a partial sectional view taken along line 4—4 of FIG. 3;

FIG. 5 is a partial sectional view showing the stator assembly and one of the end frames of the dynamoelectric machine in FIG. 1 loaded on exemplary assembly apparatus therefor;

FIGS. 6, 7 and 8 are enlarged partial sectional views showing the end frame associated with a beam of the stator assembly of FIG. 5 and illustrating principles which may be practiced in a method of assembling a dynamoelectric machine in one form of the invention;

FIG. 9 is a further enlarged sectional view generally the same as FIG. 8 and showing a free end portion of a tab on the beam with the free end portion deformed into overlaying relation with a confronting part of the end frame at one of the opposite faces thereof;

FIG. 10 is an elevational view of the construction shown in FIG. 9;

FIG. 18 is a partial exploded perspective view showing an alternative dynamoelectric machine and illustrating principles which may be practiced in an alternative method of assembling a dynamoelectric machine also in one form of the invention;

FIG. 19 is a partial sectional view showing the stator assembly of the dynamoelectric machine of FIG. 18 and one of the end frames thereof loaded onto exemplary assembly apparatus therefor; and FIG. 20 is an enlarged partial sectional view showing tooling for forming a clinched joint formed between one deformed free end portion of a tab on one beam of the stator assembly for the dynamoelectric machine of FIG. 18 and the end frame thereof.

Corresponding reference characters refer to corresponding parts throughout the several views of the drawings.

The exemplifications set out herein illustrate the preferred embodiments of the invention in one form thereof, and such exemplifications are not to be construed as limiting either the scope of the disclosure or the scope of the invention in any manner.

DETAILED DESCRIPTION OF THE PREFERRED EMBODIMENTS

Figure 1:
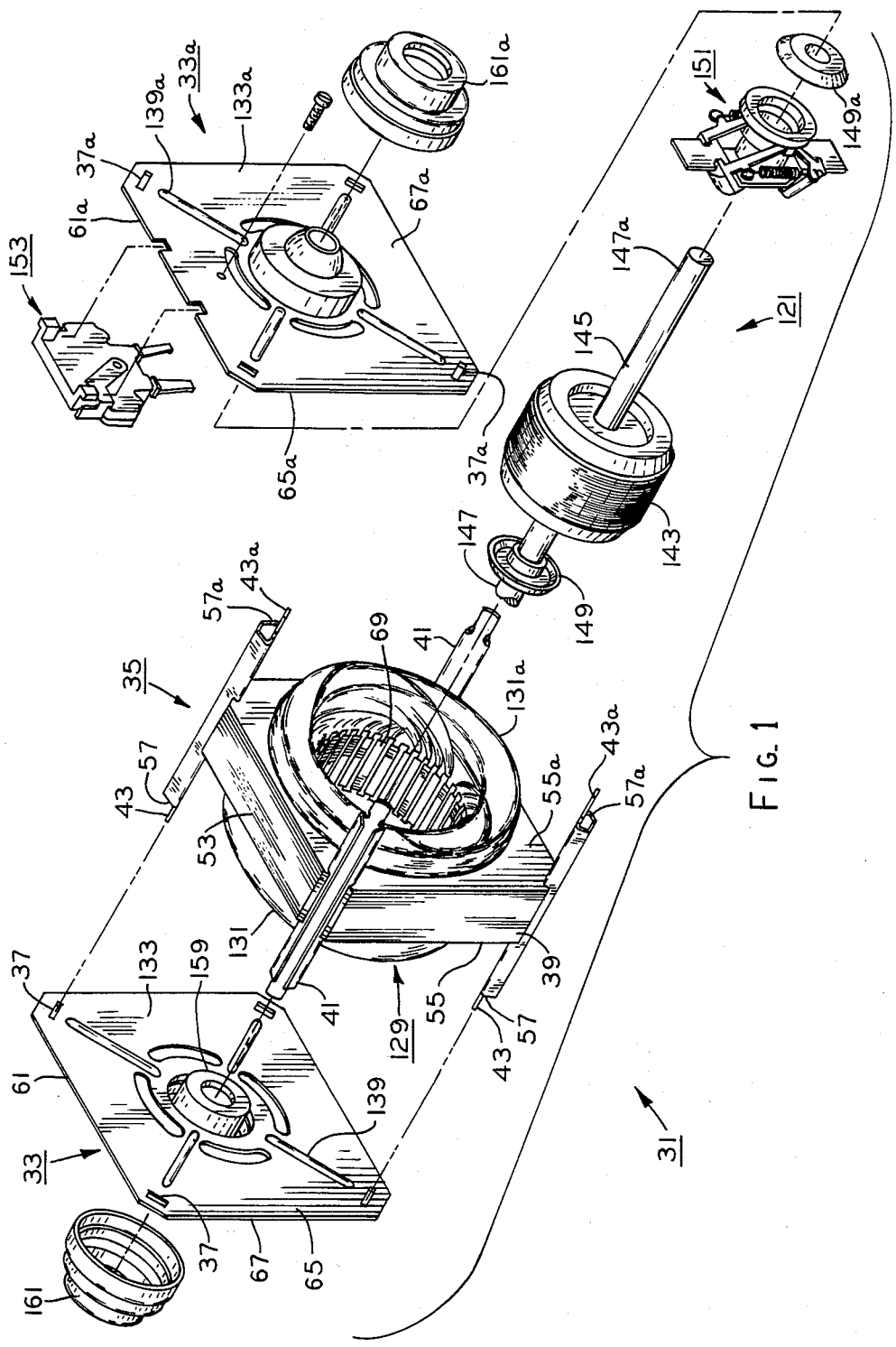
FIG. 1 is an exploded perspective view showing a dynamoelectric machine.
Figure 2:
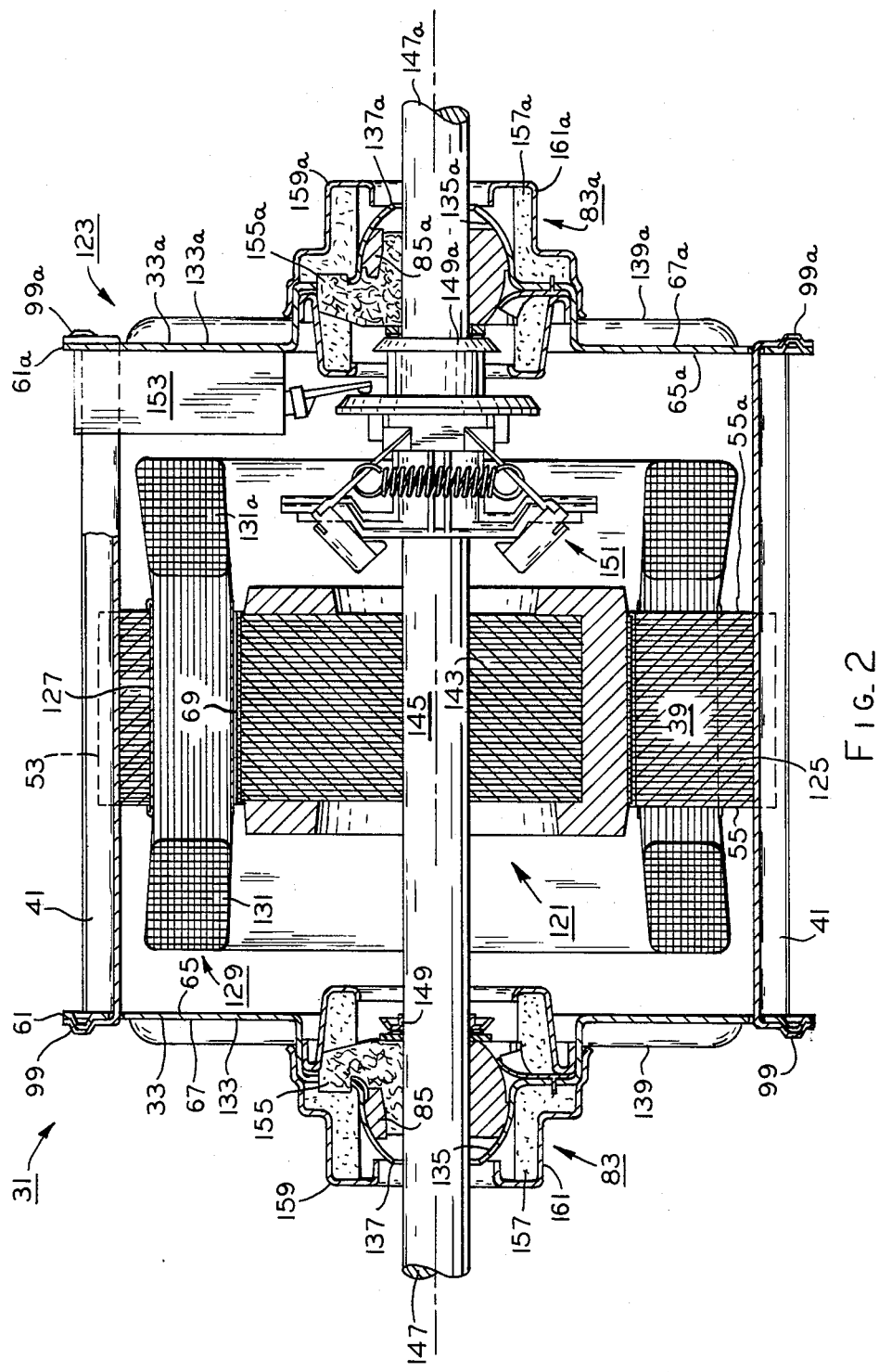
FIG. 2 is a sectional view showing the dynamoelectric machine of FIG. 1 in cross-section with the component parts thereof in assembly relation.

With reference to the drawings in general, there is illustrated in one form of the invention a method of assembling a dynamoelectric machine 31 having at least one end frame 33 and a stator assembly 35. End frame 33 includes a set of apertures 37 extending therethrough, and stator assembly 35 includes a stator core 39, a set of means, such as for instance beams 41 or the like, associated with the stator core for supporting the end frame in a preselected assembly position with respect to the stator core, and at least one set of tabs 43 on the supporting means or beams, respectively (FIGS. 1 and 2). In practicing this method, end frame 33 is disposed or arranged on beams 41 in the preselected assembly position with respect to stator core 39, and tabs 43 are received in apertures 37 in spaced apart relation therefrom with a free end portion 45 on the tabs extending beyond the end frame, respectively (FIGS. 5 and 6). Free end portions 45 of tabs 43 are displaced or otherwise deformed into overlaying relation with confronting parts 47 therefor of end frame 33 while the tabs and apertures 37 are maintained in the spaced apart relation thereof, respectively, and thereby the end frame is retained against axial displacement from the assembly position thereof (FIGS. 7–10). A set of overlaying sections 49, 51 are deformed or otherwise lanced from free end portions 45 of tabs 43 and confronting parts 47 of end frame 33 in the overlaying relation thereof, one of the deformed overlaying sections is interlocked or otherwise interconnected with at least one of the free end portions and the end frame thereby to retain the end frame against both radial and rotational displacement from the preselected assembly position thereof with respect to stator core 39, respectively (FIGS. 11–17).

More particularly and with specific reference to FIGS. 1–4, beams 41 may be formed of any suitable material having the desired physical properties, and the beams include a generally truncated or keystone shaped channel section open at the upper portion thereof and defined by a pair of opposite sidewalls or wall means 41a, 41b interconnected generally at the bottom portion thereof by a cross-wall or wall means 41c, respectively. Beams 41 are secured or mounted by suitable means to stator core 39 at least generally adjacent a circumferential or peripheral portion or surface 53 thereof, and the beams extend in generally axial opposite directions from a pair of opposite end faces or surfaces 55, 55a of the stator core which intersect with the circumferential surface thereof. If a more detailed discussion of the beam and stator core mounting arrangement is desired, reference may be had to U.S. Pat. No. 3,867,654 issued Feb. 18, 1975 to Charles W. Otto which is incorporated herein by reference. A set of abutments or abutment means 57 on beams 41 are formed generally at one of the ends of walls 41a, 41b, 41c of the beam channel section, and tabs 43 are integrally formed with cross-walls 41c of the beams so as to extend generally axially therefrom. Opposite abutments or abutment means 57a and tabs 43a of beams 41 are shown herein for purposes of disclosure as being generally of the same construction as abutments 57 and tabs 43 thereof; however, it is contemplated that various other beams having different configurations and secured in different manners to the stator core within the scope of the invention so as to meet at least some of the objects thereof. It may be noted that a set of yieldable sections, such as for instance undercuts 59, 59a or the like, are predeterminately located in tabs 43, 43a generally adjacent abutments 57, 57a and between the abutments and free end portions 45, 45a of the tabs, and such yieldable sections are discussed in greater detail hereinafter. As shown in FIGS. 3-12 for the purpose of drawing simplicity and convenience of disclosure, the letter "a" indicates corresponding opposite component parts of beams 31 and also corresponding parts of an opposite end frame 37a, as discussed hereinafter.

Apertures 37 are predeterminately located or arranged generally adjacent a circumferential or peripheral portion or edge 61 of end frame 33 for receiving tabs 43 of beams 41, as discussed in detail hereinafter, and each aperture has a sidewall 63 on the end frame intersecting with a pair of opposite faces 65, 67 thereof. Of course, apertures 37 are sized predeterminately larger than tabs 43 of beams 41 so as to receive the tabs in spaced apart relation from sidewalls 63 of the apertures, as discussed in greater detail hereinafter.

Stator core 39 is provided with a bore 69 which extends generally axially therethrough intersecting with opposite end faces 55, 55a of the stator core; however, as is well known in the art, the central axis of the bore may be slightly skewed with respect to the opposite end faces of the stator core in some instances. As best seen in FIG. 5, stator assembly 35 may be loaded onto exemplary apparatus 71 for effecting the securement of end frame 33 to the stator assembly. Upon such loading, bore 69 of stator core 39 is placed about an expandable sleeve 73 of an expandable arbor 75 which defines a preselected reference axis 77 of apparatus 71, and opposite abutments 57a on beams 41 are inserted into a set of locating recesses 79 provided therefor in the apparatus into locating engagement with generally planar locating surfaces 81 within the recesses, respectively. However, in the event that opposite abutments 57a on beams 41 are not square, i.e., generally coplanar with each other, at least one of such abutments may not be seated against its locating surface 81 within recesses 79. As previously mentioned, bore 69 of stator core 39 may be slightly skewed; therefore, in order to positively locate the central axis of the stator core bore with respect to reference axis 77 of apparatus 71, expandable sleeve 73 on arbor 75 is expanded generally radially outwardly into locating engagement with the stator core bore. In response to this locating engagement of expansible sleeve 73 on arbor 75 with bore 69 of stator core 39, stator assembly 35 may be adjustably moved so that the central axis of bore 69 in stator core 39 becomes aligned at least generally coincidentally with reference axis 77 of apparatus 71. Thus, in the event of the occurrence of the aforementioned skew in stator core bore 69, the above discussed positive location of the central axis of the bore arranges it generally concentrically about reference axis 77 of apparatus 71 thereby to compensate for such skew in the event of the occurrence thereof. Apparatus 71 does not form a part of this invention and is illustrated herein for purposes of disclosure, and if a more detailed explanation of the operation and construction of such apparatus is desired, reference may be had to the aforementioned Robert W. White application Ser. No. 506,344 filed June 21, 1983. While the apparatus disclosed in the aforementioned Robert W. White patent application is discussed herein with respect to the assembly of dynamoelectric machine 31, it is contemplated that such assembly may be accomplished employing various other apparatus of different construction and operation within the scope of the invention so as to meet at least some of the objects thereof.

End frame 33 is provided with a lubrication and bearing system 83 having an alignable bearing 85 therein, and when the central axis of stator core bore 69 is aligned with reference axis 77 of apparatus 71, as discussed above, the alignable bearing in the end frame is arranged or placed in aligning or locating relation about a coaxial guide rod 87 on arbor 75 thereby to align a central axis of the end frame with the reference axis of the apparatus. Thus, due to the coaxial arrangement of guide rod 87 on arbor 75 with reference axis 77 of apparatus 71, the arrangement of alignable bearing 85 in end frame 33 in locating engagement about the guide rod serves to align the central axis of the end frame at least generally coincidentally with reference axis 77 of apparatus 71 and with which the central axis of bore 67 in stator core 39 is aligned, as previously discussed.

With alignable bearing 85 in end frame 33 so disposed in locating engagement about guide rod 87, the alignable bearing with the end frame are moved generally downwardly on the guide rod toward the position of the end frame, as illustrated in FIG. 5, with respect to stator core 39. During this downward movement of alignable bearing 85 with end frame 33, apertures 37 in the end frame may be passed or moved over tabs 43 on beams 41 seating or engaging opposite face 65 of the end frame against at least some of abutments 57 of the beams, respectively, as previously discussed and as also seen in FIGS. 6 and 7. It may be necessary to adjustably rotate end frame 33 in the seated position thereof on abutments 57 of beams 41 in order to position sidewalls 63 of apertures 37 in the end frame in spaced apart relation from tabs 43 of the beams. Thus, it may be noted that the tabs are predeterminately arranged in spaced apart relation from sidewalls 63 of the apertures with distal free end portions 45 of the tabs extending beyond opposite face 67 of the end frame, respectively. It may be noted that due to warpage of end frame 33 and/or out of square, i.e., non-planar, abutments 57 on beams 41, an abutment end on at least one of the beams may not seat against opposite face 65 of the end frame; however, if desired, a force, as indicated by the force arrow FS, may be exerted against opposite face 67 of the end frame to insure the seating of the abutments on the beams with opposite face 65 of the end frame, as discussed in greater detail hereinafter.

Although the following discussion is applicable to the assembly of all of beams 41 on stator core 39 with end frame 33 and end frame 33a opposite thereto, only one of the beams and one of apertures 37 in the end frame is discussed hereinafter and shown in FIGS. 6-17 for purposes of brevity of disclosure and drawing simplicity. As best seen in FIG. 6, tab 43 on beam 41 is disposed adjacent opposite face 65 of end frame 33 and generally in alignment with aperture 37 of the end frame for entry thereinto, respectively. When tab 43 is passed or otherwise moved from opposite face 65 of end frame 33 through aperture 37 toward opposite face 67 thereof, as best seen in FIG. 7, a distal free end portion or distal section 45 on the tab is extended or otherwise positioned beyond opposite face 67 of the end frame, respectively. Of course, the passage of tab 43 through aperture 37 is terminated when abutment 57 on beam 41 is disposed at least generally adjacent or in engagement with opposite face 65 of end frame 33 at least generally adjacent the aperture therein, and with the beam and end frame so positioned, the tab extends through the aperture in spaced apart relation from sidewall 63 of the aperture which, as previously mentioned, is sized predeterminately greater than the tabs, respectively.

With end frame 33 so located in the assembly position thereof with respect to stator core 39, exemplary tooling 88 includes a pair of relatively rotatable jaws 89, 91 or the like, for instance, utilized to effect the displacement or deformation of free end portion 45 of tab 43 generally about yieldable section 59 therein into overlaying relation with confronting part 47 therefor of end frame 33, as best seen in FIGS. 8-10; however, apparatus for effecting the operation of such tooling, as discussed hereinafter, is omitted for purposes of brevity of disclosure and drawing simplification. To accomplish the displacement of free end portion 45 of tab 43, jaw 89 is inserted or disposed within the channel of beam 41, and a backup end or abutment 93 on the jaw is arranged in backup or abutting relation with opposite face 65 of end frame 33 at least generally adjacent confronting part 47 thereof, as best seen in FIG. 7. With jaw 89 so positioned, the other jaw 91 is actuated or rotated by suitable means (not shown) relative to jaw 89, and upon such actuation, a recessed end 95 of jaw 91 engages free end portion 45 of tab 43 beyond opposite face 67 of end frame 33. Upon further actuation of jaw 91, the engagement of recessed end 95 thereof with free end portion 45 of tab 43 effects the bending or yielding thereof generally about yieldable section 59 in the tab into the overlaying relation or engagement with confronting part 47 therefor in end frame 33 at its opposite face 67 and at least generally adjacent aperture 37 in the end frame. As previously mentioned, yieldable section 59 is predeterminately located in tab 43 between free end portion 45 thereof and abutment 57 on beam 41, and with the abutment in the seating relation thereof with opposite face 65 of end frame 33, the yieldable section is disposed about two-thirds of the way through aperture 37 in end frame 33 as measured from opposite face 65 thereof. While yieldable section 59 and its disposition with respect to aperture 37 in end frame 33 are illustrated herein for purposes of disclosure, it is contemplated that various other yieldable sections having different configurations and locations in the tab and disposed with respect to the aperture in locations other than those disclosed herein may be utilized within the scope of the invention so as to meet at least some of the objects thereof. Due at least in part to the predetermined location of yieldable section 59 in tab 43, it may also be noted that upon the deflection of free end portion 45 of the tab, the spaced apart relation of the tabs from sidewall 63 of aperture 37 in end frame 33 is maintained, as previously mentioned and as seen in FIGS. 9 and 10. Further, it may also be noted that the force applied through jaws 89, 91 to effect the aforementioned deflection of free end portion 45 of tab 43 is great enough to effect the overlaying relation thereof with its confronting part 47 of end frame 33 without effecting a permanent distortion or deflection of the end frame thereby to obviate imparting residual stresses thereto. It may also be noted that irrespective of the force FS exerted against opposite face 67 of end frame 33, as discussed above, the end frame is unrestrained in its preselected assembly position on beams 41 in the direction of radial and/or rotational displacement with respect to stator core 39. While tooling 88 is illustrated herein for purposes of disclosure, it is contemplated that other tooling having various other configurations and operable in different manners may be employed within the scope of the invention so as to meet at least some of the objects thereof.

Figure 11:
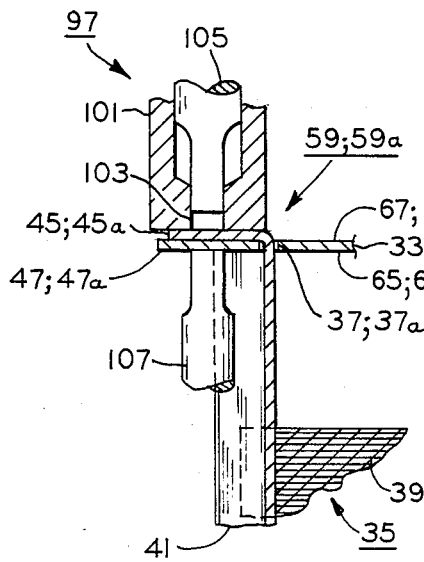
FIGS. 11–14 are enlarged partial sectional views showing exemplary clinching tooling effecting a clinched joint between the deformed free end portion of the tab and the confronting part of the end frame in the overlaying relation thereof and further illustrating principles which may be practiced in the aforementioned assembling method in one form of the invention, respectively.
Figure 12:
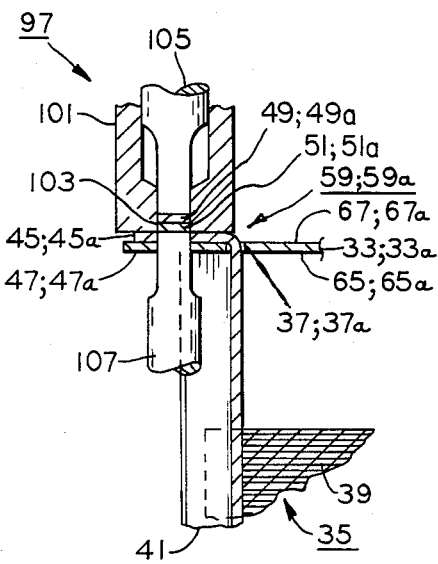
Figure 13:
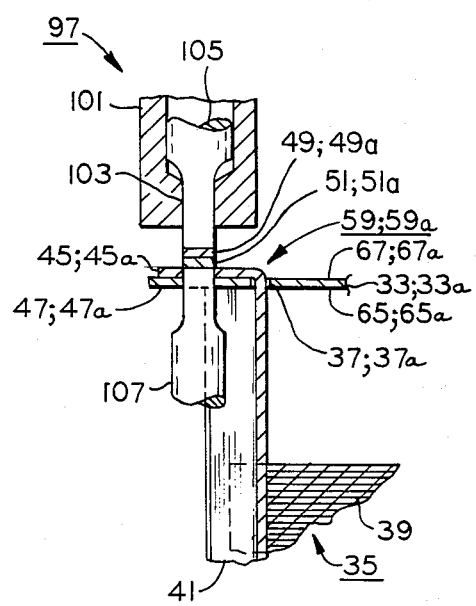
Figure 14:
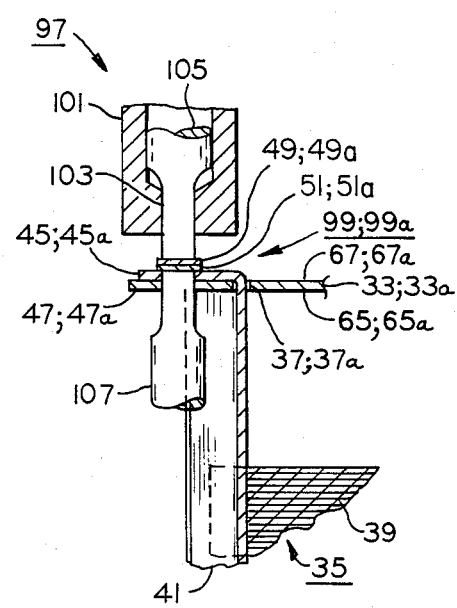
Figure 15:
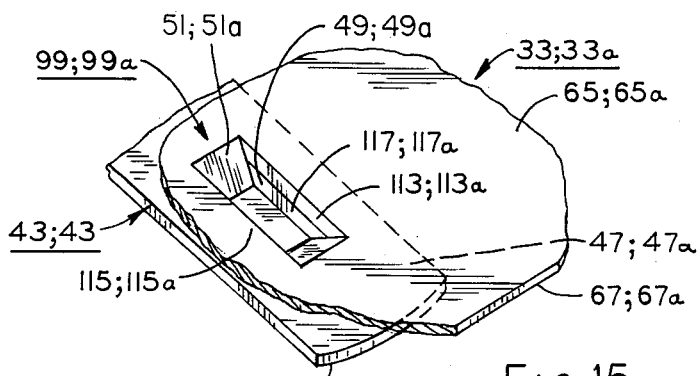
FIGS. 15 and 16 are partial perspective views of the clinched joint of FIG. 14 as viewed from the end frame side thereof and from the free end portion of the tab side thereof, respectively.
Figure 16:
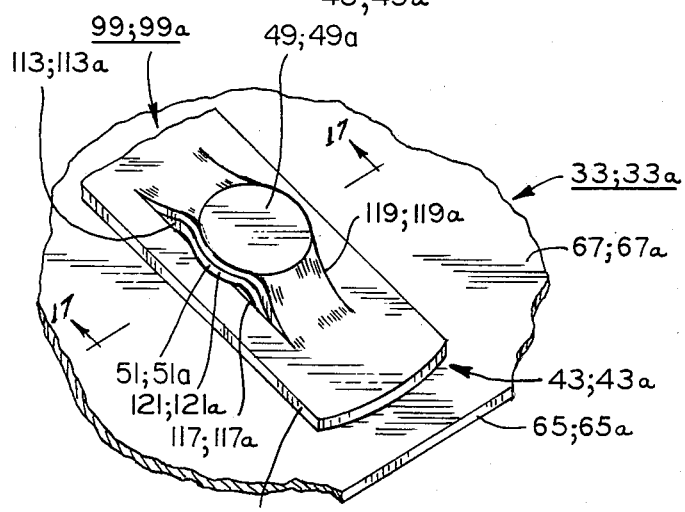
Figure 17:
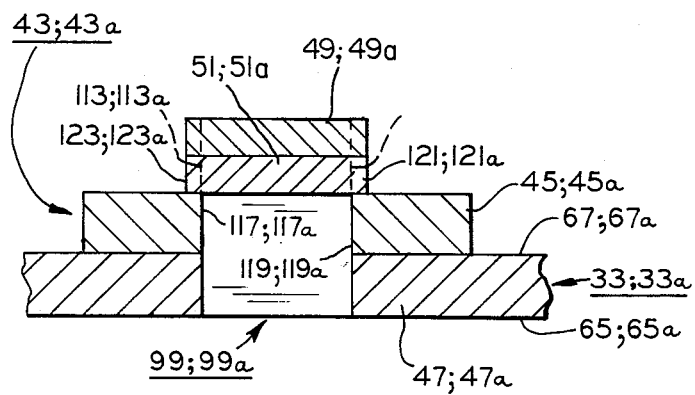
FIG. 17 is a sectional view taken along line 17—17 in FIG. 16.

Subsequent to the above discussed displacement of tab free end portion 45 into its overlaying relation with confronting part 47 therefor on end frame 33, jaws 89, 91 are opened and removed from the end frame and beam 41, and other exemplary tooling 97 is moved into association with the end frame and beams for forming a mechanical clinched joint 99 between the tab free end portion and the confronting part therefor on the end frame, as may be viewed in FIGS. 11-14. Tooling 97 includes a die 101 having a die cavity 103 therein, an anvil 105 reciprocally movable in the die and die cavity, and a punch 107 arranged in opposing relation with the die cavity; however, apparatus for effecting the operation of such tooling, as discussed hereinafter, is not a part of this invention and is omitted for the sake of brevity of disclosure and drawing simplicity. When tooling 97 is associated with end frame 33 and beam 41, punch 107 is arranged within the channel of the beam and engaged with the end frame generally at confronting part 47 thereof against opposite face 65 of the end frame, as best seen in FIG. 11. Die 101 of tooling 97 is seated in engagement with free end portion 45 of tab 43 in its overlaying relation with confronting part 47 therefor on end frame 33 thereby to dispose die cavity 103 and anvil 105 in opposing aligned relation with punch 107. Thereafter, as best seen in FIG. 12, punch 107 is actuated to deform or otherwise lance overlaying sections or segments 49, 51 from tab free end portion 45 and confronting part 47 therefor on end frame 33 in their overlaying relation, and in response to such actuation of the punch, the deformed overlaying sections are displaced into die cavity 103 of die 101 against anvil 105 thereof. When deformed overlaying sections 49, 51 are so moved into die cavity 103, at least portions of a pair of lanced opposite side edges 113, 115 on deformed overlaying section 51 displaced from confronting part 47 of end frame 33 are wedged or abutted in engagement with a pair of opposed retaining surfaces or portions 117, 119 on free end portion 45 of tab 43 which are formed upon the lancing of overlaying section 49 from the free end portion of the tab, respectively, as best seen in FIGS. 15-17. Therefore, it may be noted that the above discussed abutment between lanced opposite side edges 113, 115 on deformed overlaying section 51 and opposed retaining surfaces 117, 119 on free end portion 45 of tab 43 is effective to retain end frame 33 on beams 41 against both radial and rotational displacement from the assembly position of the end frame with respect to stator core 39, as previously mentioned. As best seen in FIG. 13, while punch 107 is maintained in its actuated position engaged with deformed overlaying section 51, die 101 is retracted upwardly thereby to disengage the die from tab free end portion 45 and die cavity 103 from deformed overlaying sections 49, 51, and anvil 105 is maintained in its position in engagement with deformed overlaying section 49. Thereafter and as best seen in FIG. 14, both anvil 105 and punch 107 are actuated in opposing relation to effect further deformation of deformed overlaying sections 49, 51 swedging or riveting opposite parts 121, 123 of section 51 over or beyond opposed retaining surfaces 117, 119 on tab free end portion 45 into gripping engagement with the tab free end portion, respectively. Thus, it may be noted that the gripping engagement between the riveted or swedged over parts 121, 123 of deformed overlaying section 51 and tab free end portion 45 is effective to at least assist in the retention of end frame 33 on beam 41 against axial displacement of the end frame with respect to stator core 39, as previously mentioned. While the formation of clinched joint 99 is described hereinabove with respect to only one tab free end portion 45 in its overlaying relation with confronting part 47 therefor of end frame 33, it is contemplated that a set of tooling 97 may be employed to form a set of the clinched joints so as to secure the end frame and all of the beams generally simultaneously or that such clinched joints may be formed separately between the end frames and respective ones of the beams within the scope of the invention so as to meet at least some of the objects thereof. Albeit not shown for purposes of brevity of disclosure and drawing simplification, it is also contemplated that the above discussed clinched joints 99 may be formed in a reverse manner to that shown herein, i.e., deformed overlaying sections 49, 51 may be punched or lanced in an opposite direction from tab free end portion 45 toward end frame 33, within the scope of the invention so as to meet at least some of the objects thereof. While tooling 97 is disclosed herein to form clinched joints 99, it is also contemplated that various other tooling having different configurations and operable in different manners to form other clinched joints of various configurations may be employed within the scope of the invention so as to meet at least some of the objects thereof. Tooling 97 and apparatus for operating the tooling is available from High-Tech Engineering Company, Warren, Mich.

Subsequent to the formation of clinched joints 99 between tab free end portions 45 and confronting parts 47 therefor of end frame 33 in their overlaying relation, the apparatus disclosed in the aforementioned Robert W. White application Ser. No. 506,344 filed June 21, 1983 may be employed to effect the shimless assembly of a rotatable assembly 121 of dynamoelectric machine 31 with stator core 39 and end frame 33 and to effect the association of opposite end frame 33a with beams 41 of stator assembly 35; however, when end frame 33a is secured to the beams in the preselected assembly position with respect to stator core 39, clinched joints 99a are formed between free end portions 45a of tabs 43a and confronting parts 47a therefor of end frame 33a in their overlaying relation in the same manner discussed hereinabove with respect to clinched joints 99, respectively. The formation of clinched joints 99, 99a to secure end frames 33, 33a to beams 41 in the assembly position of the end frames with respect to stator core 39 eliminates the possibility of imparting residual stresses thereinto, as previously mentioned; therefore, the elimination of such residual stresses obviates the possibility of the component parts springing back upon the completion of the assembly of dynamoelectric machine 31, and in this manner, the air gap between rotatable assembly 121 and bore 69 of stator core 39 may be accurately or positively controlled or maintained. Nevertheless, it is contemplated that the securement of one of end frames 33, 33a to beams 41 of stator assembly 35 may be effected by means and/or methods other than those disclosed and taught herein within the scope of the invention so as to meet at least some of the objects thereof.

With reference again in general to the drawings and recapitulating at least in part with respect to the foregoing, dynamoelectric machine 31 is shown as having at least end frame 33 with apertures 37 extending therethrough, respectively, and stator core 39 (FIG. 1). A set of means, such as beams 41 or the like for instance, is associated with stator core 39 for supporting end frame 33 in assembly relation with respect to the stator core (FIG. 1). Supporting means or beams 41 include at least one set of means, such as tabs 43 or the like for instance, for extending through apertures 37 in spaced apart relation therefrom and a set of distal means, such as free end portions 45 or the like for instance, on the extending means or tabs 43 for displacement or deformation therefrom into overlaying relation with confronting parts 47 therefor of end frame 33 thereby to at least in part retain the end frame in its assembly relation against axial displacement therefrom, respectively (FIGS. 2, 9 and 10). Distal means or free end portions 45 of tab 43 and confronting parts 47 therefor of end frame 33 in the overlaying relation thereof include a set of overlaying means, such as sections 49, 51 or the like for instance, deformed therefrom for retaining the end frame in its assembly position against both radial and rotational displacement therefrom, respectively (FIGS. 2 and 15-17).

More particularly and with specific reference to FIGS. 1 and 2, dynamoelectric machine 31 includes a stationary assembly, indicated generally at 123, and rotatable assembly 121. Stationary assembly 123 comprises stator core 39, beams 41 secured to the stator core adjacent peripheral portion 53 thereof, as previously mentioned, and opposite end frames 33, 33a secured to the beams in the manners previously discussed and as illustrated in FIGS. 6-17. Stator core 39 may be formed of a plurality of ferromagnetic laminations 125 arranged generally in face-to-face relation in a stack thereof and having opposite end faces 55, 55a intersected by bore 69 extending generally axially through the stack of laminations. Although stator core 39 is illustrated herein for purposes of disclosure, it is contemplated that various other stator cores having different configurations and formed by various different methods may be utilized within the scope of the invention so as to meet at least some of the objects thereof. A plurality of generally radially disposed winding means accommodating slots 127 are also provided in stator core 39 intersecting both bore 69 and opposite end faces 55, 55a thereof. Winding means 129, such as a plurality of conductor turns or coils thereof arranged in a desired winding configuration, is disposed in slots 127 with suitable insulation therebetween, and the winding means has a pair of opposite generally annular groupings of end turns 131, 131a thereof disposed generally about bore 69 of stator core 39 adjacent opposite end faces 55, 55a thereof, respectively.

End frames 33, 33a may be lanced or otherwise formed from a metallic sheet material, such as for instance sheet steel or the like, and it is contemplated that such formation of the end frames may be accomplished by the use of progressive dies or the like for instance (not shown). End frames 33, 33a include a pair of generally planar portions or sections 133, 133a formed so as to extend about generally central portions of the end frames which define a pair of means, such as bearing seats or seating surfaces 135, 135a or the like, for seating or bearing engaged with bearings 85, 85a, as further discussed hereinafter, and a pair of shaft receiving openings 137, 137a extend through the bearing seats, respectively. Although end frames 33, 33a are disclosed as having generally planar portions 133, 133a, the end frames may be provided with a pair of sets of means, such as for instance a plurality of ribs 139, 139a or the like, for strengthening the generally planar portions and may have passages for the passage of ambient air therethrough, respectively. Apertures or generally elongate slots 37, 37a are arranged in preselected locations generally radially outwardly of the central portion of end frames 33, 33a adjacent circumferential edges 61, 61a thereof, respectively. While the construction and configuration of end frames 33, 33a are described and illustrated herein for purposes of disclosure, it is contemplated that various other end frames having different constructions and configurations as well as being formed in different manners and of different material may be utilized within the scope of the invention so as to meet at least some of the objects thereof.

Rotatable assembly 121 includes a rotor 143 mounted to a shaft 145 between a pair of opposite shaft extensions 147, 147a for conjoint rotation therewith, and a pair of thrust devices 149, 149a are secured to the opposite shaft extensions for thrust taking or end play engagement with bearings 85, 85a of end frames 33, 33a, respectively, as previously mentioned. Rotor 143 is disposed at least in part within bore 69 of stator core 39 with a generally uniform air or flux gap therebetween and is arranged in magnetic coupling relation with winding means 129 of stator core 39 upon the excitation thereof when dynamoelectric machine 31 is energized across a power source (not shown). Although rotor 143 is illustrated herein for purposes of disclosure, it is contemplated that various other types of rotors, such as for instance one carrying a set of permanent magnet material elements for selective magnetic coupling engagement with winding means 129 upon the excitation thereof, may be utilized within the scope of the invention so as to meet at least some of the objects thereof. A centrifugal mechanism 151 is carried on opposite shaft extension 147a for conjoint rotation therewith, and if a more detailed discussion of the construction and operation of the centrifugal mechanism is desired, reference may be had to U.S. Pat. No. 4,208,559 issued June 17, 1980 to Steven J. Gray which is incorporated herein by reference. Of course, centrifugal mechanism 151 is arranged to operate a switch assembly 153 carried on end frame 33a for controlling the energization of winding means 129 on stator core 39 during the energization of dynamoelectric machine 31, as well known in the art, and if a more detailed discussion of the construction and operation of the switch assembly and the association thereof with the winding means and the end frame, reference may be had to the commonly assigned James L. King patent application Ser. No. 496,552 filed May 20, 1983 and the commonly assigned James P. Frank and James L. King patent application Ser. No. 496,524 filed May 20, 1983 which are respectively incorporated herein by reference. Depending upon the winding configuration of winding means 129, it is, of course, contemplated that centrifugal mechanism 151 and switch assembly 153 may be omitted from dynamoelectric machine 31 within the scope of the invention so as to meet at least some of the objects thereof. Opposite shaft extensions 147, 147a extend through shaft openings 137, 137a in end frames 33, 33a and are received in journaling engagement with bearings 85, 85a arranged on bearing seats 135, 135a on the end frames, respectively. If a more detailed discussion of the construction of bearings 85, 85a and seats 135, 135a is desired, reference may be had to the U.S. Pat. No. 4,409,714 issued Oct. 18, 1983 to Eldon R. Cunningham which is incorporated herein by reference. While bearings 85, 85a are illustrated herein for purposes of disclosure, it is contemplated that other types of bearings such as for instance sleeve bearings, ball or roller bearings or bearings integral with the end frames or the like, may be utilized within the scope of the invention so as to meet at least some of the objects thereof. As previously mentioned, thrust devices 149, 149a are carried on opposite shaft extensions 147, 147a for thrust taking or end play limiting engagement with bearings 85, 85a, respectively, in a manner well known to the art.

Lubrication and bearing systems 83, 83a also include a pair of feeder wicks 155, 155a associated with bearings 85, 85a and arranged in lubricating engagement with opposite shaft extensions 147, 147a and a pair of lubricant storage wicking means 157, 157a arranged to contain and flow flow lubricant to the feeder wicks, respectively. Storage wicking means or material 157, 157a, may be GELUBE available from the General Electric Company Fort Wayne, Ind., and if a more detailed discussion of the composition and operation of the storage wicking material is desired, reference may be had to U.S. Pat. No. 3,894,956 issued July 15, 1975 to James A. Whitt which is incorporated herein by reference. While feeder wicks 155, 155a and storage wicking material 157, 157a are illustrated herein for purposes of disclosure, it is contemplated that various other feeder and storage wicks having different shapes, formed of different materials and associated in different manners with each other and with the bearings may be utilized within the scope of the invention so as to meet at least some of the claims thereof. To complete the description of dynamoelectric machine 31, retaining means or oil well covers 159, 159a are secured to opposite faces 65, 65a of end frames 33, 33a and cushion ring adaptors 163, 163a for carrying cushion rings (not shown) are secured to opposite faces 67, 67a of the end frames generally about the central portions thereof to retain storage wicks 157, 157a in place with respect to feeder wicks 157, 157a and bearings 85, 85a, respectively; however, it is contemplated that other means may be employed with the end frames to effect the retention of the storage wick within the scope of the invention so as to meet at least some of the objects thereof.

With reference to FIGS. 18–20, there is shown an alternative dynamoelectric machine 171 and an alternative method of assembling such having generally the same component parts assembled in generally the same manner as those of the previously discussed dynamoelectric machine 31 with the exceptions noted hereinafter; however, while such alternative dynamoelectric machine and assembling method meet at least some of the objects set out hereinabove, it is believed that such alternative dynamoelectric machine and assembling method may have indigenous objects and advantageous features as will be in part apparent and in part pointed out in the following discussion.

In practicing this alternative method of assembling dynamoelectric machine 171, free end portions 45 of tabs 43 are bent or otherwise deformed generally about yieldable sections 59 therein by suitable tooling (not shown), and a set of surfaces 173 on the bent free end portions of the tabs are positioned or arranged at least generally in coplanar relation with each other, respectively, as shown in FIG. 18. Stator assembly 35 with free end portions 45 of tabs 43 extending generally in coplanar relation with each other, as discussed above, may be associated with apparatus 71 to effect the alignment of the centerline axis of stator bore 39 with reference axis 77 of the apparatus, as discussed in detail hereinbefore and as shown in FIG. 19. Alignable bearing 85 in end frame 33 is then disposed in aligning engagement about guide rod 87 of arbor 75, and the alignable bearing and the end frame are moved generally downwardly on the guide rod toward the preselected assembly position of the end frame, as illustrated in FIG. 19, with respect to stator core 39. Of course, the arrangement of bearing 85 in end frame 33 in locating engagement about guide rod 87 on arbor 75 serves to align the central axis of the end frame with reference axis 77 of apparatus 71 and with which the central axis of bore 67 in stator core 39 is aligned. It may be noted that when end frame 33 is in its assembly position, force FS may be exerted thereon to urge confronting parts 47 of the end frame at opposite face 65 thereof into seating relation or engagement with at least some of surfaces 173 on tab free end portions 45 in the generally coplanar relation thereof, respectively. Of course, end frame 33 may have to be rotatably adjusted or adjustably moved generally about the engagement of bearing 85 with guide rod 85 on arbor 75 to attain the assembly position of the end frame. Thereafter, as best seen in FIG. 20, tooling 97 may be associated with free end portion 45 of tab 43 and confronting part 47 therefor on end frame 33 in the overlaying relation thereof for forming mechanical clinched joint 99. Clinched joint 99 and the formation thereof by tooling 97 in the assembly of dynamoelectric machine 171 is the same as that previously discussed in detail hereinbefore with respect to FIGS. 11-17 with the exception of the reversal in the overlaying relation of end frame 33 and tab free end portion 45; however, it is believe that such exception is clearly understandable without the necessity of further explanation. Of course, with end frame 33 secured to stator assembly 35 of dynamoelectric machine 171, the opposite end frame 33a and rotatable assembly 121 may be assembled therewith in the same manner previously discussed hereinabove with respect to dynamoelectric machine 31.

With reference again to the drawings in general and recapitulating at least in part with respect to the foregoing, there is illustrated in one form of the invention a method of assembling dynamoelectric machine 171 having end frame 33, stator core 39, supporting means or beams 41 including tabs 43 extending therefrom, respectively (FIGS. 18-20). In this method, tabs 43 are deformed, and end frame 33 is associated in its assembly position with confronting parts 47 thereof in overlaying relation with the deformed tabs, respectively (FIGS. 18 and 19). Overlaying sections 49, 51 are deformed from deformed tabs 43 and confronting parts 47 therefor of end frame 33, and one of the deformed overlaying sections is interlocked with at least one of the deformed tabs and the end frame thereby to retain the end frame in its assembly position against displacement therefrom, respectively (FIGS. 11-17 and 20).

Dynamoelectric machine 171 has a stator 39 and a set of beams 41 mounted to the stator (FIGS. 18-20). The beams 41 include tabs 43, yieldable sections 59 predeterminately located in the tabs, and free end portions 45 on the tabs and displaced generally about the yieldable sections therein so as to extend generally in coplanar relation with each other, respectively (FIGS. 18 and 19). End frame 33 is supported on beams 41 in an assembly position with respect to stator 39 and has confronting parts 47 disposed generally in overlaying relation with the displaced free end portions 45 on tabs 43, respectively (FIG. 19). Displaced free end portions 43 on tabs 45 and confronting parts 47 of end frame 33 in the overlaying relation thereof include overlaying sections 49, 51 deformed therefrom, and one of the overlaying sections is interconnected with one of the displaced free end portions and the end frame so as to retain the end frame on beams 41 against displacement from the assembly position of the end frame with respect to stator 39, respectively (FIGS. 11-17 and 20).

From the foregoing, it is now apparent that novel methods of assembling dynamoelectric machines 31, 117 have been presented meeting the objects set out above as well as others, and it is contemplated that changes as to the precise arrangements, shapes, connections and details of the constructions illustrated herein by way of example for purposes of disclosure, as well as the precise steps and order thereof of the methods, may be made by those having ordinary skill in the art without departing from the spirit of the invention or the scope thereof as defined by the claims which follow.

What we claim as new and desire to secure by Letters Patent of the United States is:

1. A method of assembling a dynamoelectric machine having at least one end frame and a stator assembly, the at least one end frame including a pair of opposite faces, and a set of apertures having sidewalls intersecting with the opposite faces, respectively, and the stator assembly including a stator core having a bore therethrough, a set of beams mounted to the stator core and extending in generally axial directions therefrom, at least one set of abutments on the beams, a set of tabs extending from the abutments and sized predeterminately smaller than the sidewalls of the apertures in the at least one end frame, and a set of yieldable sections in the tabs predeterminately located between a free end portion of the tabs and the abutments on the beams, respectively, the method comprising the steps of:

arranging the apertures in the at least one end frame about the tabs on the beams and extending the tab free end portions beyond one of the opposite end faces of the at least one end frame, respectively;

seating the other of the opposite end faces of the at least one end frame in engagement with at least some of the abutments on the beam;

adjusting the at least one end frame generally radially on the beams into an assembly position with respect to the stator core when the other opposite end faces of the at least one end frame is seated against the at least some abutments in the beams and arranging thereby the sidewalls of the apertures in the at least one end frame generally in spaced apart relation from the tabs on the beams, respectively;

applying a force onto the one opposite face of the at least one end frame and urging thereby the other opposite face of the at least one end frame toward the seating engagement thereof with the at least some abutments on the beams;

displacing the free end portions of the tabs generally about the yieldable sections therein into overlaying relation with confronting parts of the at least one end frame on the one opposite face thereof and at least in part retaining thereby the at least one end frame against axial displacement from its assembly position on the beams with respect to the stator core, respectively;

deforming generally simultaneously a set of overlaying sections from the tab free end portions and the confronting parts of the at least one end frame in the overlaying relation thereof and interlocking one of the deformed overlaying sections with one of the tab free end portions and the confronting parts of the at least one end frame in the overlaying relation thereof so as to retain the at least one end frame against rotational and radial displacement from its assembly position on the beams with respect to the stator core, respectively; and maintaining the spaced apart relation between the tabs on the beams and the sidewalls of the apertures in the at least one end frame during both the displacing and retaining step and the deforming and interlocking step without retaining the at least one end frame against rotational and radial displacement from its assembly position with respect to the beams other than the force applied onto the at least one end frame in the applying and urging step, respectively.

2. The method as set forth in claim 1 comprising the preliminary step of aligning the bore of the stator core at least generally concentrically about a preselected reference axis.

3. The method as set forth in claim 1 comprising the force applied onto the one opposite face of the at least one end frame great enough to deflect the at least one end frame in the event of warpage threin and thereby effect the seating of the other opposite face thereof against each of the abutments on the beams during the applying and urging step, respectively.

4. The method as set forth in claim 1 wherein the deforming and interlocking step includes further deforming the overlaying sections and engaging the one deformed overlaying section at least in part into gripping engagement with the one of the tab free end portions and the at least one end frame so as to assist in the retention by the tab free end portions against the axial displacement of the at least one end frame on the beams from its assembly position with respect to the stator core, respectively.

5. A method of assembling a dynamoelectric machine having at least one end frame and a stator assembly, the at least one end frame including a pair of opposite end faces, and a set of apertures having sidewalls intersecting with the opposite end faces, respectively, and the stator assembly including a stator core, a set of beams mounted to the stator core, at least one set of abutments on the beams, a set of tabs extending from the abutments and sized predeterminately smaller than the sidewalls of the apertures in the at least one end frame, and a set of yieldable sections in the tabs predeterminately located between a free end portion of the tabs and the abutments on the beams, respectively, the method comprising the steps of:

arranging the apertures in the at least one end frame about the tabs on the beams with the free end portions of the tabs extending beyond one of the opposite faces of the at least one end frame and seating the other of the opposite faces of the at least one end frame against at least some of the abutments on the beams, respectively;

locating the at least one end frame with respect to the beams with the tabs thereof in spaced apart relation from the sidewalls of the apertures in the at least one end frame, respectively;

displacing the free end portions of the tabs generally about the yieldable sections therein into overlaying relation with confronting parts of the at least one end frame on the one opposite face thereof and at least in part retaining thereby the at least one end frame against axial displacement on the beams with respect to the stator core, respectively;

deforming overlaying sections from at least some of the tab free end portions and the confronting parts of the at least one end frame in the overlaying relation thereof and interlocking one of the deformed overlaying sections in part with one of the tab free end portions and the at least one end frame so as to retain the at least one end frame against rotational and radial displacement on the beams with respect to the stator core, respectively; and maintaining the spaced apart relation between the tabs on the beams and the sidewalls of the apertures in the at least one end frame during both the displacing and retaining step and the deforming and interlocking step, respectively.

6. The method as set forth in claim 5 comprising the intermediate step of urging the other opposite face of the at least one end frame toward seating engagement with the abutments on the beams subsequent to the locating step, respectively.

7. The method as set forth in claim 5 wherein the deforming and interlocking step includes further deforming the deformed overlaying sections and engaging the one deformed overlaying section in gripping engagement with one of the tab free end portions and the confronting parts of the at least one end frame in the overlaying relation thereof so as to at least assist in the retention of the at least one end frame on the beams against the axial displacement of the at least one end frame with respect to the stator cores, respecively.

8. A method of assembling a dynamoelectric machine having at least one end frame and a stator assembly, the at least one end frame including a pair of opposite faces, and a set of apertures having sidewalls intersecting with the opposite faces, respectively, and the stator assembly including a stator core, a set of beams mounted to the stator core, at least one set of abutments on the beams, and a set of tabs extending from the abutments, respectively, the method comprising the steps of:

arranging the sidewalls of the apertures in the at least one end frame in spaced apart relation about the tabs on the beam with free end portions of the tabs extending beyond one of the opposite faces of the at least one end frame and seating the other of the opposite faces thereof against at least some of the abutments on the beams, respectively;

displacing the free end portions of the tabs into overlaying relation with confronting parts of the at least one end frame at the one opposite face thereof and at least in part retaining thereby the at least one end frame on the beams against axial displacement with respect to the stator core, respectively;

deforming from at least some of the overlaying tab free end portions and confronting parts of the at least one end frame a pair of overlaying sections thereof and engaging one of the deformed overlaying sections in part with one of the at least some tab free end portions and the at least one end frame so as to retain the at least one end frame on the beams against radial and rotational displacement with respect to the stator core, respectively; and maintaining the spaced apart relation between the tabs on the beams and the sidewalls of the apertures in the at least one end frame during both the displacing and retaining step and the deforming and engaging step, respectively.

9. The method as set forth in claim 8 wherein the tabs include a set of yieldable sections predeterminately located therein and wherein the displacing and retaining step includes deflecting the tab free end portions generally about the yieldable sections in the tabs, respectively.

10. The method as set forth in claim 8 comprising the intermediate step of biasing the at least one end frame to insure the seating of the other opposite face thereof against the abutments on the beams, respectively.

11. The method as set forth in claim 8 wherein the stator assembly further includes a bore in the stator core and comprising the preliminary step of locating the bore with respect to a preselected reference axis.

12. The method as set forth in claim 8 wherein the deforming and engaging step includes interlocking the one deformed overlaying section with one of the at least some tab free end portions and the at least one end frame so as to at least assist in the retention of the at least one end frame against the axial displacement thereof on the beams with respect to the stator core, respectively.

13. A method of assembling a dynamoelectric machine having at least one end frame and a stator assembly, the at least one end frame having a set of apertures extending therethrough, and the stationary assembly including a stator core, a set of means associated with the stator core for supporting the at least one end frame in a preselected assembly position with respect to the stator core, and at least one set of tabs on the supporting means, respectively, the method comprising the steps of:
 disposing the at least one end frame on the supporting means in the preselected assembly position with respect to the stator core and receiving the tabs in the apertures in spaced apart relation therefrom with a free end portion on the tabs extending beyond the at least one end frame, respectively;
 displacing the tab free end portions into overlaying relation with confronting parts of the at least one end frame and retaining thereby the at least one end frame against axial displacement from the preselected assembly position thereof; and
 deforming sets of overlaying sections from the tab free end portions and the confronting parts of the at least one end frame in the overlaying relation thereof and interlocking one of the deformed overlaying sections in part with one of the tab free end portions and the at least one end frame thereby to retain the at least one end frame against radial and rotational displacement from the preselected assembly position thereof, respectively.

14. The method as set forth in claim 13 wherein the tabs have a set of yieldable sections therein and wherein the displacing and retaining step includes bending the tab free end portions generally about the yieldable sections, respectively.

15. The method as set forth in claim 13 wherein the displacing and retaining step includes maintaining the at least one end frame in the assembly position thereof on the supporting means with respect to the stator core, respectively.

16. The method as set forth in claim 13 comprising the intermediate step of exerting against the end frame a force having a magnitude at least great enough to maintain the at least one end frame against axial displacement from its assembly position on the supporting means, respectively.

17. The method as set forth in claim 13 wherein the deforming and interlocking step includes maintaining the at least one end frame in the assembly position thereof on the supporting means with respect to the stator core, respectively.

18. The method as set forth in claim 13 wherein the deforming and interlocking step includes further deforming the deformed overlaying sections and associating the one deformed overlaying section in part in gripping engagement with the one of the tab free end portions and the at least one end frame so as to assist in the retention of the at least one end frame on the supporting means against the axial displacement from the assembly position of the at least one end frame with respect to the stator core, respectively.

19. A method of assembling a dynamoelectric machine having at least one end frame and a stator assembly, the at least one end frame including a pair of opposite faces, and the stator assembly including a stator core, a set of beams mounted to the stator core and extending generally in an axial direction therefrom, at least one set of tabs on the beams, at least one set of surfaces on the tabs, and a set of yieldable sections predeterminately located in the tabs, respectively, the method comprising the steps of:
 bending a free end portion of the tabs generally about the yieldable sections therein and positioning thereby the surfaces on the bent free end portions of the tabs at least generally in coplanar relation with each other, respectively;
 arranging the at least one end frame in an assembly position with respect to the stator core and seating one of the opposite faces of the at least one end frame against at least some of the surfaces on the bent free end portions of the tabs when the surfaces are in the at least general coplanar relation with each other, respectively; and
 deforming at least generally simultaneously a pair of overlaying sections from each of the bent free end portions of the tabs and the at least one end frame in the overlaying relation thereof and interlocking one of the deformed overlaying sections in part with one of the bent free end portions of the tabs and the at least one end frame so as to retain the at least one end frame against axial, rotational and radial displacement from its assembly position with respect to the stator core, respectively.

20. A method of assembling a dynamoelectric machine having at least one end frame with a pair of opposite faces thereon, a stator core, a set of beams mounted to the stator core, and at least one set of tabs on the beams, respectively, the method comprising the steps of:
 deforming a free end portion of the tabs and arranging the deformed free end portions at least generally in coplanar relation with each other, respectively;
 disposing one of the opposite faces on the at least one end frame in engagement with the deformed free end portions of the tabs and associating thereby confronting parts of the at least one end frame in overlaying relation with the deformed free end portions of the tabs, respectively; and
 securing together at least some of the deformed free end portions of the tabs and at least some of the confronting parts of the at least one end frame in the overlaying relation thereof and retaining thereby the at least one end frame against axial, rotational and radial displacement on the beams with respect to the stator core, respectively.

21. The method as set forth in claim 20 wherein the stator assembly further includes a set of yieldable sections predeterminately located in the tabs, respectively, and wherein the deforming and arranging step includes yielding the yieldable sections thereby to effect the deformation of the free end portions of the tabs, respectively.

22. The method as set forth in claim 20 wherein the securing and retaining step includes displacing a pair of sections from each of the at least some deformed free end portions of the tabs and the at least some confronting parts of the at least one end frame and engaging one of the displaced sections at least in part with one of the at least some free end portions of the tabs and the at least one end frame thereby to effect the retention of the at least one end frame against the radial and rotational displacement thereof on the beams with respect to the stator core, respectively.

23. The method as set forth in claim 22 wherein the securing and retaining step further includes further displacing at least one of the one displaced sections and the other of the displaced sections and effecting thereby the engagement of the one displaced sections at least in part with the one of the at least some tabs and the at least one end frame at the other of the opposite faces thereof so as to at least assist in the retention of the at least one end frame against the axial displacement thereof on the beams with respect to the stator core, respectively.

24. The method as set forth in claim 20 wherein the dynamoelectric machine also has another end frame and wherein the method further comprises the additional step of securing the another end frame to the beams with the stator core being interposed between the at least one end frame and the another end frame, respectively.

25. A method of assembling a dynamoelectric machine having at least one end frame, a stator core, a set of means associated with the stator core for supporting the at least one end frame with respect to the stator core and with the supporting means including at least one set of tabs extending therefrom, respectively, the method comprising the steps of:
deforming the tabs and associating the at least one end frame in the assembly position on the supporting means with respect to the stator core and with confronting parts of the at least one end frame in overlaying relation with the deformed tabs, respectively; and
deforming a pair of overlaying sections from at least some of the deformed tabs and at least some of the confronting parts of the at least one end frame in the overlaying relation thereof and interlocking one of the deformed overlaying sections at least in part with one of the at least some deformed tabs and the at least one end frame thereby to retain the at least one end frame on the supporting means against displacement with respect to the stator core, respectively.

26. The method as set forth in claim 25 wherein the deforming and interlocking step includes engaging the one deformed overlaying sections in part with the one of the at least some deformed tabs and the at least one end frame so as to retain the at least one end frame against radial and rotational displacement thereof on the supporting means with respect to the stator core, respectively.

27. The method as set forth in claim 26 wherein the deforming and interlocking step further includes further deforming at least one of the one deformed overlaying sections and the other of the deformed overlaying sections and associating thereby the one deformed overlaying sections at least in part in abutment with the one of the at least some deformed tabs and the at least one end frame so as to at least assist in the retention of the at least one end frame against axial displacement thereof on the supporting means with respect to the stator core, respectively.

28. The method as set forth in claim 25 wherein the supporting means further includes a set of yieldable sections located in the tabs, respectively, and wherein the deforming and associating step includes yielding the yieldable sections to effect the deformation of the tabs at least generally about the yieldable sections, respectively.

29. The method as set forth in claim 25 wherein the at least one end frame includes a set of apertures therein and wherein the method further comprises the preliminary step of extending the tabs through the apertures, respectively.

30. The method as set forth in claim 29 wherein the supporting means further include a set of means for abutment with the at least one end frame and with the tabs extending beyond the abutment means, respectively, and wherein the deforming and associating step includes seating the at least one end frame against at least some of the abutment means.

31. The method as set forth in claim 30 wherein the deforming and associating step further includes applying a force onto the at least one end frame and effecting thereby the seating of the at least one end frame against the at least some abutment means, respectively.

32. The method as set forth in claim 25 wherein the stator core includes a bore and wherein the method further comprises the preliminary step of locating the bore of the stator core with respect to a preselected reference axis.

33. The method as set forth in claim 25 wherein the dynamoelectric machine also has another end frame and wherein the method further comprises the additional step of securing the another end frame to the supporting means with the stator core being interposed between the at least one end frame and the another end frame.

* * * * *